US006942791B1

(12) United States Patent
Petrov et al.

(10) Patent No.: US 6,942,791 B1
(45) Date of Patent: Sep. 13, 2005

(54) APPARATUS AND METHOD FOR RECYCLING OF DROSS IN A SOLDERING APPARATUS

(76) Inventors: Radko G. Petrov, 31012 Tamarack, Apt. 21112, Wixom, MI (US) 48393; Mark Razdolsky, 2353 Camron Ct., West Bloomfield, MI (US) 48324

( * ) Notice: Subject to any disclaimer, the term of this patent is extended or adjusted under 35 U.S.C. 154(b) by 0 days.

(21) Appl. No.: 10/616,933

(22) Filed: Jul. 11, 2003

Related U.S. Application Data

(60) Provisional application No. 60/395,947, filed on Jul. 16, 2002.

(51) Int. Cl.[7] .............................. B23K 1/00; B23K 3/08
(52) U.S. Cl. ...................... 210/175; 210/179; 210/205; 210/776; 210/767; 228/34; 228/56.2; 228/37; 228/214; 134/93; 134/105
(58) Field of Search ................................ 210/175, 179, 210/205, 776, 767; 228/34, 56.2, 37, 214; 134/93, 105

(56) References Cited

U.S. PATENT DOCUMENTS

| | | | | |
|---|---|---|---|---|
| 5,240,169 A | * | 8/1993 | Gileta | 228/180.1 |
| 5,345,056 A | * | 9/1994 | Frei et al. | 219/121.59 |
| 5,616,424 A | * | 4/1997 | Carey et al. | 428/647 |
| 6,080,497 A | * | 6/2000 | Carey et al. | 428/647 |
| 6,214,218 B1 | * | 4/2001 | Kawashima et al. | 210/179 |
| 6,235,208 B1 | * | 5/2001 | Kawashima et al. | 210/767 |

* cited by examiner

Primary Examiner—Duane Smith
Assistant Examiner—Minh-Chau T. Pham
(74) Attorney, Agent, or Firm—Alex Rhodes

(57) ABSTRACT

An apparatus and method for eliminating dross in a solder pot of a soldering machine by converting the dross into usable solder. The conversion apparatus is comprised of an impeller, a shroud, an electric motor for driving the impeller, a vacuum source operatively connected to the shroud, an arrangement of guides immersed in the solder pot for recirculating liquid solder and a chemical de-oxidizing agent. The impeller and shroud are adjacent to a free surface of the dross which forms at the top portion of the liquid solder. The method includes the steps of adding a measured amount of de-oxidizing agent to the solder pot, agitating and recirculating the liquid solder/de-oxidizer mixture with the impeller to break-up the dross into smaller particles and separate the solder from the dross, and removing a residue of the dross by suction as the recirculating mixture passes beneath the shroud.

7 Claims, 4 Drawing Sheets

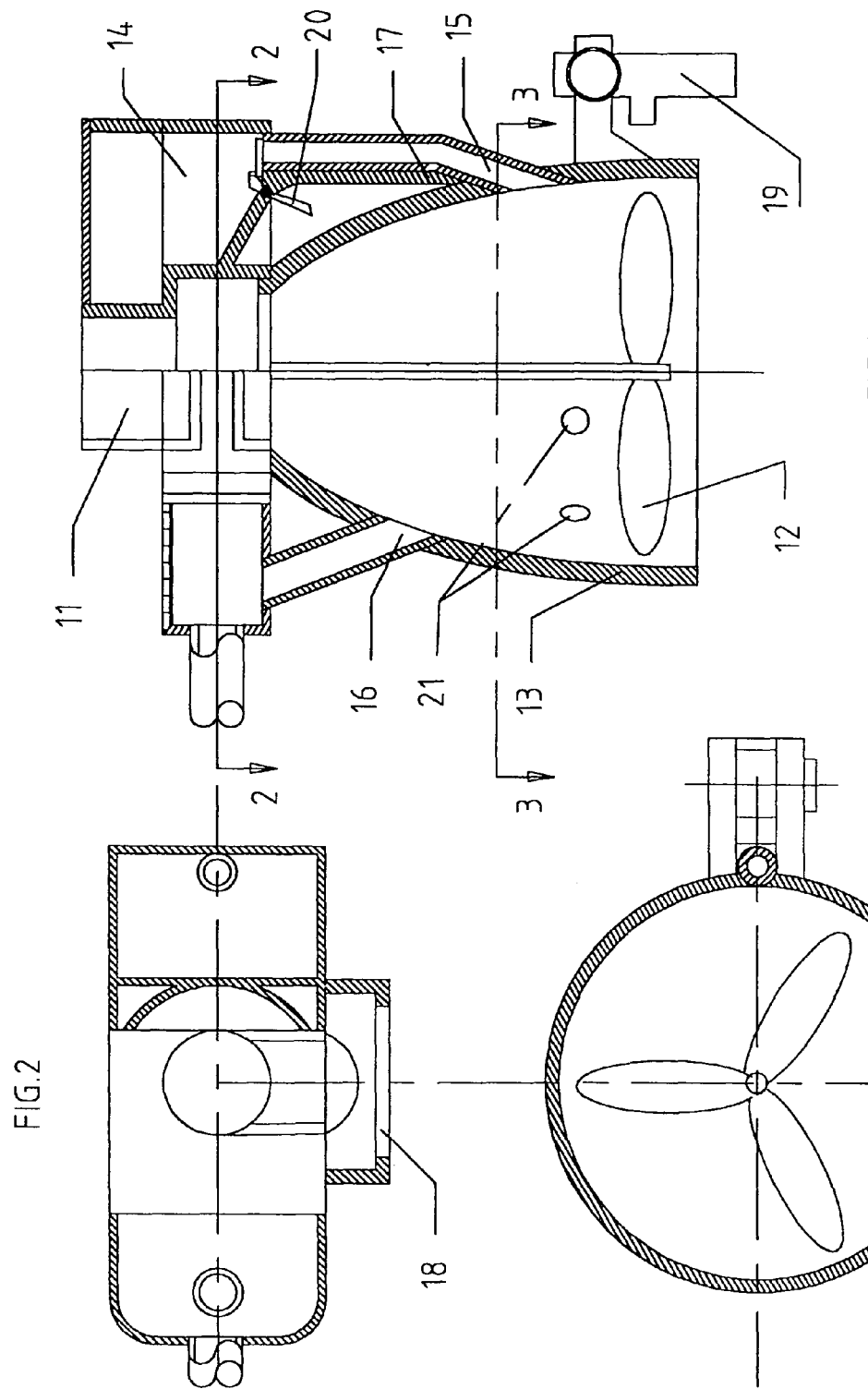

APPARATUS AND METHOD FOR RECYCLING OF DROSS IN A SOLDERING APPARATUS

This application claims priority of Provisional Application Ser. No. 60/395,947 filed on Jul. 16, 2002.

FIELD OF THE INVENTION

This invention relates to soldering and, more specifically, to a method and apparatus for recycling of dross in a soldering apparatus where tin or lead-tin based solder is present in liquid form.

BACKGROUND OF THE INVENTION

Wave soldering method is most commonly used for soldering printed circuit boards and the like, wherein liquid solder from a solder pot passes through a solder pump and overflows. One of the main problems with this method is that oxide of tin (dross) and/or another oxide of molten metal in the solder forms on the surface of the liquid solder and is an undesirable matter in the wave. Presence of a significant quantity of dross in the liquid solder reduces soldering quality and, at some point, makes soldering impossible. Various solutions to this problem have been offered. These solutions primarily restrict formation of dross by various means, including: 1) an introduction of oil over the surface of the liquid solder; 2) isolating of the solder pot and/or soldering apparatus in a nitrogen atmosphere, to prevent air contacting the solder; 3) reducing turbulence of liquid solder through mechanical means and 4) by introducing a deoxidizing agent over the dross, the agent being a product obtained by adding a potassium salt to ammonium borohydrochloride, commercially available as a non-organic separating/reducing agent for solder oxides (marketed under trade mark KLEENOX OR-904P and under different trade names), or organic separating/reducing agent as described in U.S. Pat. No. 6,214,218. Another solution is to periodically mechanically remove dross from the surface of liquid solder in the pot, such as described in U.S. Pat. No. 5,087,356. Regardless of the methods being used, dross accumulates in liquid solder over a period of time and needs to be periodically collected from the pot and to be recycled in a separate costly apparatus, such as described in U.S. Pat. No. 5,755,889, or in an outside facility.

SUMMARY OF THE INVENTION

A principal object of the present invention is to enable conversion of dross into usable solder in any type of flow soldering process and apparatus by mixing the dross with a reducing agent directly in a dross reservoir. By direct conversion of the dross the need for removal and outside recycling is significantly reduced. As a result, soldering quality is improved, soldering and equipment maintenance cost are reduced. There is also a positive effect from reduced traffic of harmful to environment material and thus lesser chance of a spill, and a positive effect on soldering machine operator's health from reduced exposure to harmful particles and vapors.

The present invention provides an apparatus and method for recycling of dross directly in a solder pot of a soldering machine where tin and/or lead-tin based solder is present in liquid form. The present invention allows for recycling to be conducted during operation of the soldering machine, so as to achieve continuous operation of the said soldering machine.

The apparatus in the first embodiment, consists of a shroud covered impeller, driven by a motor mounted over said shroud, where said impeller intensively agitates dross forming on the surface of liquid solder, also mixing said dross with the anti-oxidant agent, non-organic (also known as Solder Oxide Reducing Powder, Hi-Grade Anti-Oxidant Powder, etc.) or organic, which is introduced by means external to the shroud of the said apparatus on to the surface of forming dross within confines of the said shroud. Powdery substance resulting from the chemical reaction is evacuated through an opening in the shroud by way of external to the apparatus means, such as a vacuum line, and collected in an outside reservoir for further use, while recycled solder in liquid form remains in the solder pot.

In the second embodiment, the invention provides means for automatic or semi-automatic recycling of dross formations by an electronically (PLC) controlled apparatus engaged by way of electrical and/or pneumatic, and/or hydraulic power, and by introducing modifications to the solder pot, to include a pot with rounded corners; integrated dross reservoir within the solder pot, in order to collect and recycle dross; solder guide for directing the flow of solder and dross toward the dross reservoir.

The method requires that the anti-oxidant agent is applied on to the surface of the dross and thereafter the two are intensively mixed together with a mechanical means in such way as to significantly increase the contact between these two substances within the volume of dross, and to increase the temperature of the dross to the temperature of the molten solder. This results in an accelerated chemical reaction, converting the dross back into liquid solder and a powdery byproduct.

BRIEF DESCRIPTION OF THE DRAWINGS

FIG. 1 is a vertical cross-sectional view through a hand held dross mixing apparatus according to the present invention.

FIG. 2 is a view in section 2—2 of the hand held dross mixing apparatus according to the present invention.

FIG. 3 is a view in section 3—3 of the hand held dross mixing apparatus according to the present invention.

DESCRIPTION OF THE INVENTION—APPARATUS

Figure 4:
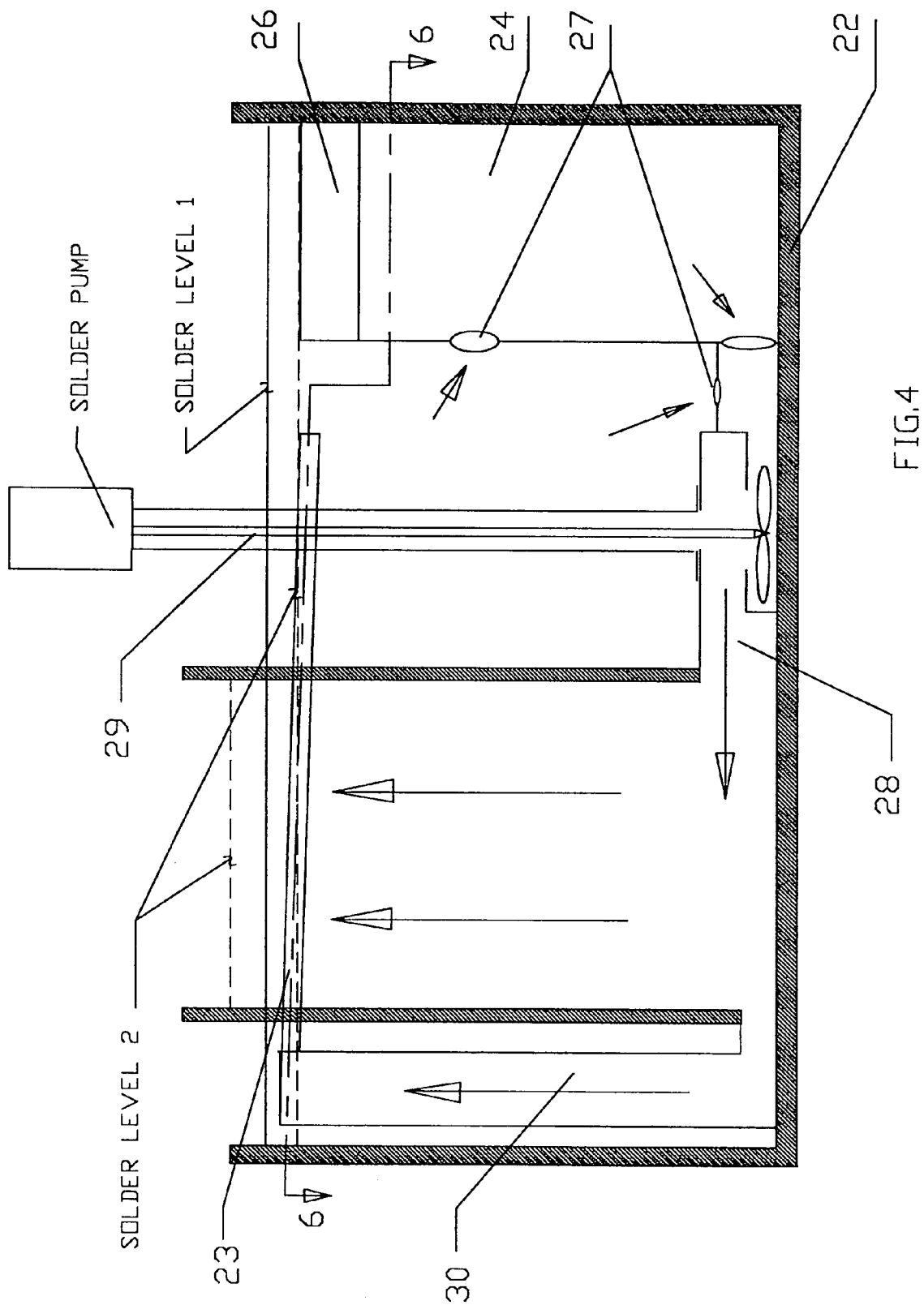
FIG. 4 is a schematic cross-sectional view of the solder pot with a top and bottom solder guides and dross reservoir according to the present invention.

Referring to the drawings, FIG. 1 through FIG. 3 show a hand held Mixing Apparatus comprising a motor #11, which rotates one or more impellers 12; shroud 13, covering the impellers, said shroud also having openings with tubular inserts 15 for loading anti-oxide agent, and 16 for evacuating powdery byproduct of dross deoxidation process; chamber 14, holding anti-oxide agent, and releasing mechanism 20, which allows for a measured quantity of anti-oxide agent to be discharged under the shroud 13, said mechanism can be manually or automatically operated. Opening 16 is connected to a vacuum line and a collecting reservoir. Openings 15 and 16 can be combined into one line with an alternating valving mechanism. The said shroud also may house a mesh, separating the lower part of the shroud with opening 15 from the upper part with opening 16, said mesh is to prevent large pieces of dross and/or drops of molten solder from escaping through the opening 16. The Mixing Apparatus can be manually manipulated using a grip handle 17, and can be mounted onto a Soldering Apparatus FIGS. 4–5 by means of an attaching bracket 18 and against a positive stop provided by adjustable holder 19.

Whenever dross recycling becomes necessary, the Mixing Apparatus is lowered over the open area of dross reservoir 25 in the solder pot. The positive stop provided by holder 19 is adjusted such that the lower edge of the shroud is submerged by approximately 10–20 mm below the liquid surface. The anti-oxide agent is then applied, quantity of which is proportional to the size of the area being covered and depth of dross on the surface. The motor 11 driving the impeller(s) 12 is then turned on and a vacuum motor (not shown) is turned on thereafter in order to evacuate the light byproduct of the reaction.

Figure 5:
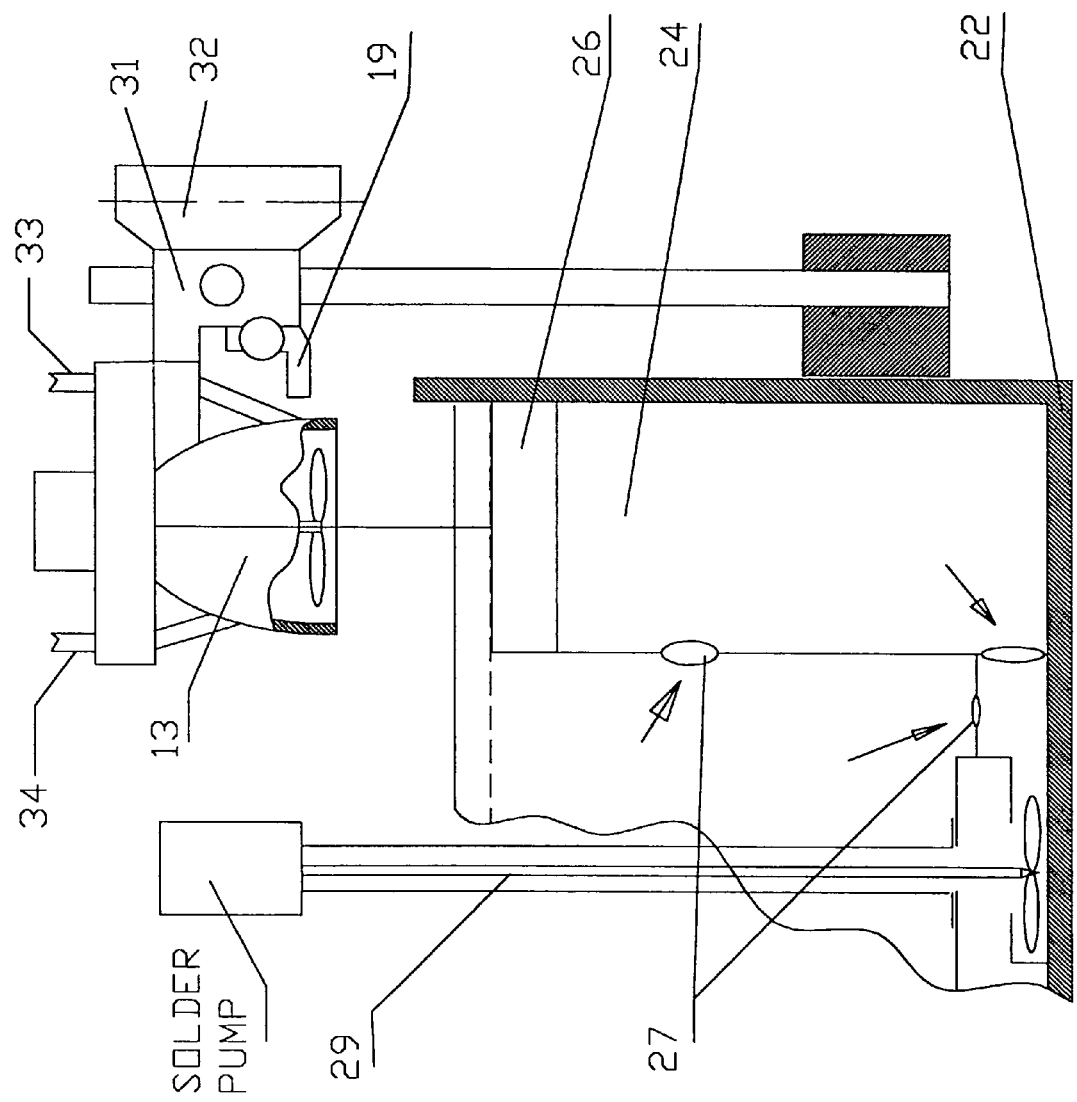
FIG. 5 is a fractional cross-sectional view of a part of solder pot, dross reservoir and dross mixing apparatus with positioning and controlling hardware according to the present invention.
Figure 6:
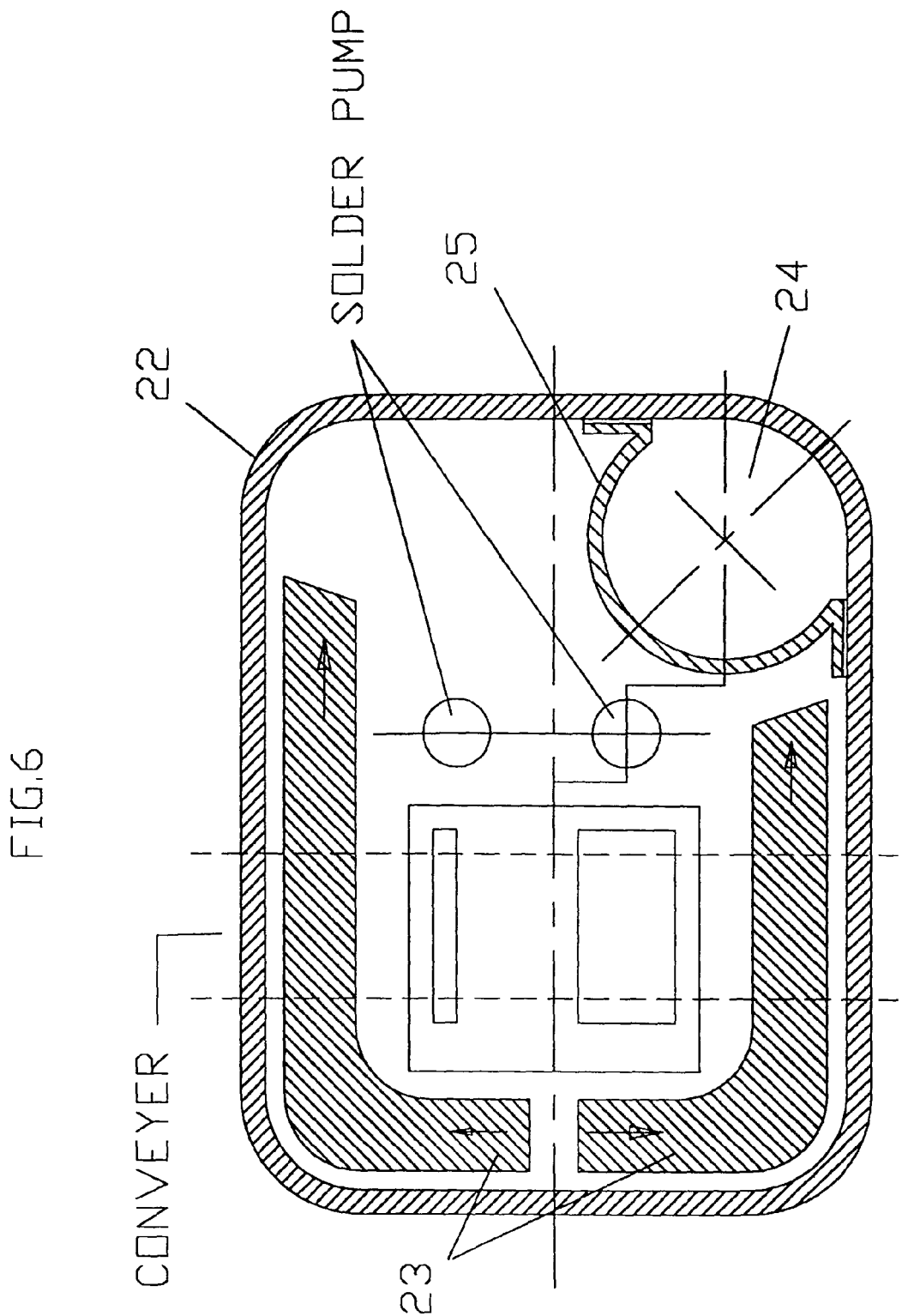
FIG. 6. is a view in section 6—6 on FIG. 4, featuring top solder guides of soldering apparatus, dross reservoir of the solder pot.

In addition to the apparatus and features described above, the second embodiment of the present invention, represented in FIG. 4, FIG. 5 and FIG. 6, is comprised of the following features: solder pot 22, having rounded corners to allow for reduced turbulence in the flow of solder through the pot and reduced retention of dross in the corners; main solder guide 28, directing the flow of solder generated by the solder pump 29 toward the top of the solder pot to form main solder wave; another solder guide 30, directing the flow toward the back of the pot and outside the main wave where the flow is divided by the two solder guides 23, directing the surface flow toward dross reservoir 24, where dross is mixed with anti-oxide agent by the mixing apparatus, described as the first embodiment of the invention. The dross reservoir is formed by the rounded wall of the solder pot 22 and a partition wall 25, having adjustable height top 26 to accommodate varying level of solder in the pot, and perforations 27 to allow solder circulation within the reservoir.

The said Mixing Apparatus can be engaged manually or semi-automatically or fully automatically, utilizing sensing mechanisms for quantity of dross formed on the surface of dross reservoir, motors to bring mixing apparatus into working position over the dross reservoir, and PLC controls to activate and de-activate the mixing mechanism, including actuation of anti-oxidant agent discharge mechanism and turning vacuum line on and off.

DESCRIPTION OF THE INVENTION—METHOD

It was observed in conducted experiments that effectiveness of anti-oxidant agent increases significantly when it is actively mixed with dross and molten solder, hence the following methodology was developed.

Method of recycling of solder dross directly in th solder pot of soldering apparatus consists of the steps of applying anti-oxidant agent onto the surface of solder dross; intensively mixing said dross with the anti-oxidant until such time that the dross and the agent are well mixed together in the volume of molten solder and their temperature is the same as of molten solder (which may vary depending on solder composition), so as to promote chemical reaction between the antioxidant and dross; evacuating powdery byproduct of the chemical reaction, which can be further recycled.

The same method can be used to recycle dross outside of the soldering apparatus in a separate reservoir, provided that proper temperature conditions exist in the reservoir for the described chemical reaction.

Although only several embodiments of my invention have been described, it is not my intentioOn to limit the scope of my invention to these embodiments, since other embodiments can be derived by such obvious changes as elimination and/or combinations of parts, substitution of parts, inversions of parts, re-arrangement of parts and substitutions of materials, without departing from the spiriet thereof.

What we claim is new is:

1. An apparatus for eliminating dross from liquid solder in a solder pot of a soldering machine comprised of: a means for breaking up said dross into small particles and recirculating said liquid solder, said dross and a non-solder residue in said solder pot; a shroud having a lower opening in adjacent and covering relationship to a free surface of said liquid solder in said solder pot; a chemical de-oxidizing agent to separate said dross into liquid solder and said non-solder residue; and a vacuum source connected to said shroud for removing a portion of said non-solder residue when said portion of said non-solder residue is adjacent to said lower opening of said shroud.

2. The apparatus recited in claim 1 further comprising a means in said solder pot for directing a flow of said liquid solder and said non-solder residue in said solder pot.

3. The apparatus recited in claim 1 wherein said de-oxidizing agent is a mixture of a potassium salt and borohydrochloride.

4. The apparatus recited in claim 1 wherein said means for breaking up and recirculating said liquid solder, said dross and said non-solder residue is an impeller.

5. A method for eliminating dross from solder in a solder pot of a soldering machine comprised of the steps of; breaking up said dross into small particles and recirculating said solder, said dross and a non-solder residue in said solder pot; adding a chemical de-oxidizing agent to said solder pot to chemically divide said dross into liquid solder and said non-solder residue; and applying a vacuum to said non-solder residue to remove said non-solder residue from said solder pot.

6. An apparatus for eliminating dross from liquid solder in a solder pot of a soldering machine comprised of: an impeller for breaking up said dross into small particles and recirculating said liquid solder, said dross and said non-solder residue in said solder pot; a shroud having a lower opening in adjacent and covering relationship to a free surface of said liquid solder in said solder pot; a mixture of a potassium salt and borohydrochloride to separate said dross into liquid solder and said non-solder residue; and a vacuum source connected to said shroud for removing a portion of said non-solder residue when said portion of said non-solder residue is adjacent to said lower opening of said shroud.

7. A method for eliminating dross from liquid solder in a solder pot of a soldering machine comprising the steps of: adjusting a height of a dross reservoir in a solder pot to allow solder in said solder pot to flow into said reservoir; directing a flow of said solder with a solder guide toward a top of the solder pot to form a main solder wave; directing a flow of a portion of said solder into said dross reservoir; and mixing said solder in said dross reservoir with an anti-oxidant agent to separate dross in said solder pot from said solder.

* * * * *